Dec. 26, 1961  C. A. KEISLING ETAL  3,014,687
AIR COMPRESSOR DRAIN VALVE
Filed July 24, 1958

INVENTORS
Charles A. Keisling
and
Norman R. Stanley
BY Clayton L. Jenks
ATTORNEY

United States Patent Office 3,014,687
Patented Dec. 26, 1961

3,014,687
AIR COMPRESSOR DRAIN VALVE
Charles A. Keisling, 463 Linden St., Boylston Center, Mass., and Norman R. Stanley, 6 Colonial Hill Drive, West Boylston, Mass.
Filed July 24, 1958, Ser. No. 750,763
1 Claim. (Cl. 251—48)

This invention relates to apparatus for draining liquid from a compressed air tank.

Compressed air as required for many uses, such as automobile brakes and pneumatic tools, is maintained within pre-determined pressure limits in a storage tank. The compressor, usually a reciprocating air pump, draws air from the atmosphere and forces it under the required pressure into the tank. Since the air contains moisture, a considerable amount of water accumulates in the tank, and particularly on humid days, and this should be drained from the tank without interfering materially with the maintenance of pressure therein. This is especially important where the compressor system is exposed to frigid air, such as when mounted on an automobile truck.

Various types of drain valves have been employed with such compressed air tanks, but these have either been complex in structure or have required supplemental governors or control units to cause proper operation of the water drain valve. A typical drain valve has comprised a small chamber of definite volume and a double acting valve system, including an entrance valve for admitting liquid from the tank to the chamber, and an exit valve for exhausting the accumulated liquid. The entrance valve is normally open to allow the accumulated liquid to enter the fixed volume compartment, and when that valve is closed the exit valve is opened to permit discharge of the liquid. The exit valve is opened by a piston operated by the compressed air as controlled by a governor, and it is usually closed by means of a spring having a pre-determined tension. That spring is required to force the air within the valve back to an unloader valve or governor which vents the air from the compressor head so as to permit the compressor to start automatically for its next cycle. Thus, if the spring becomes weaker with time, it functions less efficiently. During a weather period of high humidity, more water may accumulate in the tank than can be discharged by a valve compartment of a fixed volume, so that the water accumulates and is not fully discharged as needed. This condition is particularly present when the compressor is permitted to operate for a long run cycle of air compression and is stopped for only a very short period of time. The accumulation of water in the compressed air system of an automobile subjected to extremely low temperature conditions also presents serious disadvantages, such as when a back pressure caused by ice in the discharge line hinders operation of the valve.

The primary object of the invention is to provide a drain valve which causes the automatic drainage of water or other liquid from a compressed air system, and wherein the quantity of liquid removed is not dependent on a fixed volume compartment in the valve but the liquid is permitted to escape in a quantity determined only by the air pressure and the time during which the valve is held open.

The compressor, if actuated by an electric motor, may be automatically stopped by an electric switch in the motor line which is opened when the pressure within the tank reaches a pre-set maximum, and that switch is closed to start the air compression when a minimum is reached. The compressor may also be driven through a clutch from a constant speed power mechanism, such as a gasoline operated motor, and in that case the compressor action is governed by control of the clutch. Since the compressor piston chamber is under the full air tank pressure at the time of stopping its action, it is desirable to release that pressure within the compressor chamber by means of an unloading device and thus provide for easy starting of the piston. Some constructions as heretofore made required a spring strong enough to close the drain valve against the pressure of the compressed air and so force some of that air back through the unloader valve.

It is a further object of this invention to employ the compressed air released or unloaded to the atmosphere from the compressor head for opening the drain valve in a construction which provides a time controlled operation and wherein the closing of the drain valve is effected by the compressed air and not by a spring or other supplemental mechanism.

A further object is to provide a drain valve construction in which the period during which the drain valve is held open for the discharge of liquid from the air tank is determined by the rate at which the air under pressure in the valve is released.

A further object is to adjust the opening of an air release orifice and thereby control the rate at which the drain valve is closed by the pressure of the air within the tank. Other objects will be apparent in the following disclosure.

In accordance with the invention, the drain valve construction comprises a single valve which releases liquid within the compressor tank directly to the outer air, and wherein the volume of liquid thus drained away is controlled solely by the time during which the valve is held open. The drain control valve is opened by means of a piston operated by the residual compressed air in the compressor head which must be unloaded before the compressor can be started again. The piston has a sufficiently greater piston area over that provided by the valve itself, so that the compressed air withdrawn from the compressor head will move the piston and open the drain valve against the tank air pressure on a smaller area valve surface. The air which opens the valve is released from the compressor head by a pressure unloading device and through the piston chamber to the atmosphere at a rate determined by the size of an exit orifice, and thus when the pressure of the releasing air on the piston has decreased to below the pressure of the tank air against the valve, the valve will be immediately closed, so that in this very rapid operation the tank water will be blown out with a minimum or negligible loss of compressed air.

Referring to the drawings illustrating one embodiment of this invention:

Figure 1:
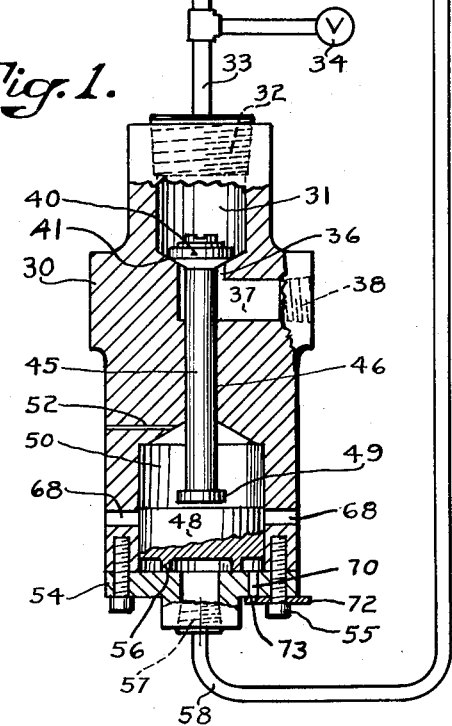
FIG. 1 is a substantially full size sectional view of the drain valve in a pipe line with a storage tank having a compressor and unloader valve system connected thereto and which are shown diagrammatically in a reduced size.

As shown diagrammatically in FIG. 1, a storage tank 10 has air under pressure admitted thereto through a pipe 11 connected with a compressor 12. The latter may have a piston 13, and preferably a pair of oppositely reciprocating pistons, connected to a crankshaft 14 and belt driven by a suitable motor. The piston, as diagrammatically shown, is reciprocably mounted in the piston chamber of the compressor. When the piston moves downwardly, air is drawn into the piston chamber through inlet pipe 16, as is permitted by a spring pressed valve 17 of suitable construction which opens and closes as required. The upward movement of the piston 13 serves to close valve 17 and open a further spring pressed valve 18 suitably mounted in an exit leading to the pipe 19. The air passes to the tank through a suitable check valve 20, such as one having a ball held against a seat by a spring. These parts are so arranged that the compressed air may be forced past the valve ball and into the pipe 11 and the tank. At the retracting movement of the piston, the check valve closes and prevents escape of the compressed air. These compressor and valve parts as thus shown diagrammatically may be suitably constructed according to standard practice to satisfy the requirements. The crankshaft 14 may be belt driven from an electric motor 25 of suitable characteristics or other source of power, such as a shaft driven through a clutch by an internal combustion engine or motor. This motor is so controlled by a suitable automatic pressure actuated switch mechanism that it is started when the tank pressure reaches a minimum and stopped when the tank pressure reaches a maximum.

The discharge valve of this invention comprises a casing 30, which may be made as a single casting of aluminum, brass, or other suitable material. The casing has spaced substantially non-communicating compartments separated by a central wall, one being an entrance or drain chamber providing for the discharge of the liquid and compressed air through a drain valve port, and the other carrying a piston for operating the drain valve. The upper end of the casing has an entrance passage or drain chamber 31 which is connected by internal screw threads 32 to a pipe 33 (shown in reduced size), and the latter is connected into the bottom of the air tank 10 at a low point where water or other liquid may accumulate. A T-connection is made from the pipe 33 to a hand operated valve 34 which is customarily applied to the system for inspection or other purposes.

The air and water inlet compartment or passage 31 leads through a port 36 to a middle compartment having a lateral passage 37 which may be provided with screw threads 38 for connecting to a pipe line for leading the discharge away from the valve as may be desired. The air pressure within the tank 10 is normally prevented from escape to passage 37 by a valve 40 at the bottom of the entrance chamber 31 which has a conical surface 41 seating against a mating conical seat at the top of the port or reduced sized entrance to the passage 37, as shown. The valve 40 and its seat may be made of suitable material, but we have found that neoprene or the metal of the valve casing 30 may be used. The parts are so shaped as to make a tight seal and normally prevent any escape of air from the tank 10.

If the valve 40 is lifted momentarily, then any water or other liquid or sludge which may have accumulated at the bottom of the tank as well as in the pipe 33 and passage 31 will be forcibly ejected through the lateral passage 37 to the atmosphere or a further pipeline, as desired. The valve 40 is removably or fixedly mounted on the top of a vertical valve stem 45 which passes downwardly through a cylindrical opening 46 in the central wall of the casing body 30. The valve stem 45 has a free sliding fit within the slideway 46, and the latter is preferably made sufficiently long so as to prevent lateral tilting of the stem and insure a proper seating of the valve. This slideway is such that the drain chamber and the piston chamber are substantially non-communicating. The valve stem is preferably vertical so as to have the aid of gravity for the valve operation, but this is not necessary and the valve may be mounted in any desired angular arrangement.

The valve stem 45 and its valve 40 are lifted by a freely movable cylindrical piston 48 which may be, if desired, connected to the stem 45, but it is preferably free relative thereto, as shown. The stem 45 may be provided with an enlarged head 49 which is slightly remote from the top of the piston 48 when the valve is closed, so that if the valve 40 and its seat 41 become worn, nevertheless there will be sufficient space between the parts 48 and 49 to insure that the valve will always seat tightly. The piston 48 is slidably fitted within a vertical cylindrical piston chamber 50 which has required dimensions for permitting the necessary piston movement. A lateral hole 52 is drilled through the body 30 so as to connect the piston chamber with the outside atmosphere and prevent any material back pressure when the piston moves. The port 52 is located near the top of the piston chamber 50 or below that top by a distance substantially equal to the height of the enlarged head 49 of the valve stem 45 so that if any water escapes downwardly through the comparatively loose bearing between the valve stem 45 and the slideway 46, then when the piston 48 moves to its uppermost position, water lying against the head of the piston may be discharged laterally through the port 52.

A plate 54 is removably fitted on the bottom of the valve casing 30, as by means of cap screws 55, and thus provides a closed space beneath the piston 48 into which air under pressure may be admitted to operate the piston. The bottom of the piston is preferably cut away to provide an annular rib 56 having a flat face for seating against the plate 54. The rib surrounds a screw threaded opening 57 through the end plate 54 of the piston chamber and to which a suitably threaded pipe line 58 is connected to introduce air under pressure to the under side of the piston. The piston 48 has a face area materially greater than the top face of the valve 40 and therefore it can force the valve 40 upwardly against the downward pressure of the air on the valve 40 and so lift the latter from its seat. This differential area may be 4:1, for example, so that there is a considerable margin of operational force to lift the valve 40 against the tank pressure.

The piston 48 is operated in the embodiment shown by the residual compressed air remaining in the compressor head or above the reciprocable piston 13 of the air compressor at the time when the motor 25 is stopped. In a compressor having two oppositely moving balanced pistons, this air volume remains nearly constant. The residual air in the piston head must be removed or unloaded at the end of the compressing cycle, so that the motor 25 which is usually of low torque may readily start the compressor when the tank pressure reaches a minimum. That compressed air in the compressor head has usually been discharged directly to the atmosphere, but in the construction of this invention the residual air in the compressor is employed to operate the piston 48 and thus lift the drain valve 40. The connecting pipe lines 58 and other related parts have a sufficiently small internal diameter so that such air as remains under pressure in the compressor head will transmit adequate force to lift the piston 48.

The pipe line 58 connects with the pipe 19 through an unloading valve 60 having a conical valve member 62 seating against a suitably shaped seat within the casing 60. That valve 62 is normally held closed not only by the pressure of the air in the system but further by a helical compression spring 63 mounted between the valve head and the end of the valve casing. Thus normally the compressed air cannot escape from the compressor chamber to the pipe 58 and the drain valve.

When the pressure control device, which may be of suitable construction, operates to break the circuit to the motor 25, or to throw a clutch in the drive mechanism, this serves to draw forward towards the left a pin 64 traveling in an arcuate slot in the wall of the switch casing 65 and swing a lever 66, pivoted at its top, towards the left and move the valve stem 67 to open the valve 62 carried thereby. This releases or unloads the compressed air in the compressor head above the piston 13 and discharges it through the pipe 58 to the space below the drain valve piston 48 and thus serves to drive that piston up and open the valve 40 for the release of liquid thereabove.

A series of ports 68 in the wall of the piston chamber 50 connect with the outer atmosphere, and the height of the piston and its chamber are such that the ports 68 are uncovered when the piston 48 reaches the top of its travel. Thus all excess of the compressed air from pipe 58 is exhausted to the air when the piston 48 has moved to open the valve 40. Immediately thereafter, the air pressure above the head of the valve 40 strives to close the valve, since it is no longer opposed by compressed air beneath the piston 48. However, the exhaust ports 68 are so located as to be open only about one-third of the time of travel of piston 48. That is, the space above piston 48 in the chamber 50 is just enough to contain the piston 48 and leave the ports 68 open, but as soon as the piston has traveled downwardly far enough to close the side ports, the piston moves only at a rate permitted by compression of the air beneath the piston and its escape from beneath the piston. This gives a time control for the closing of valve 40.

A primary feature of this invention resides in an exit port 70 connecting with the space beneath the piston. The port has a very small bore (shown at about full size) so as to hinder the movement of air therethrough but permit downward movement of the piston at a controlled rate and provide sufficient time for the discharge of all liquid past the valve 40. This port 70 communicates with the space at the bottom of the piston chamber which is outside of the annular rib 56, so that when air under pressure is admitted through the pipe 58 from the pressure unloading device to the piston chamber, the piston initially receives the full pressure of that air and thus is forced quickly upwardly to contact and move the stem 45 and open the valve 40. During the brief time after the valve 40 has been forced open, any water that has accumulated will be discharged rapidly through the exit orifice 38 by the high pressure blast of air that passes downwardly from the tank. The piston 48 moves upwardly so quickly that the small exit port 70 does not affect its movement materially before ports 68 are uncovered. The port 70 controls the downward travel of the piston. That is, as soon as ports 68 have been closed by the downwardly moving piston 70, the air therebeneath is compressed initially by the weight of piston 48 and as the compressed air above the valve 40 exerts its downward pressure. The resistance of the compressed air beneath the piston 48 serves to hold the valve 40 open long enough for the liquid discharge.

Figure 3:
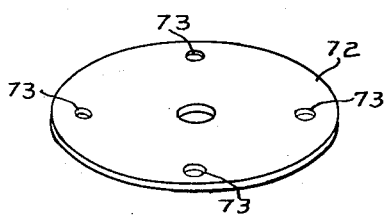
FIG. 3 is an enlarged isometric view of the adjustment which provides an air exit orifice of adjustable size.

A further feature of the invention involves adjusting the size of that exit passage 70, as is shown in FIGS. 1 and 3, so that the downward movement of the piston 48 may be controlled and either speeded up or slowed down as conditions warrant. This construction comprises in the embodiment illustrated a disk 72 having a series of concentrically arranged holes 73 of different sizes which may be serially located to communicate with the primary opening 70 in the plate 54. The disk may be mounted either above or below the plate and held in place by means of one of the cap screws 55 which is suitably threaded into the casing 30. If the disk 72 is employed, then the opening 70 is made as large as the largest of the openings 73. By loosening the cap screw 55, the disk 72 may be rotated to position any one of the different sized ports 73 in communication with the exit port 70 and thus provide a regulation of the rate of discharge of the air from beneath the operating piston 48.

The size of the orifice 70 determines the lowest pressure at which the drain valve operates, as well as the rate of closing the valve 40. It has been found that an orifice of 0.070 inch diameter will operate satisfactorily between 25 and 200 pounds tank pressure. That size of orifice permits the valve 40 to stay open for about 3 seconds at 200 pounds pressure. The time varies as the square root of the pressure. Hence, at 50 pounds the valve stays open for about 6 seconds. The adjustment of orifice size thus permits holding the valve open for a predetermined period for a given tank pressure.

Figure 2:
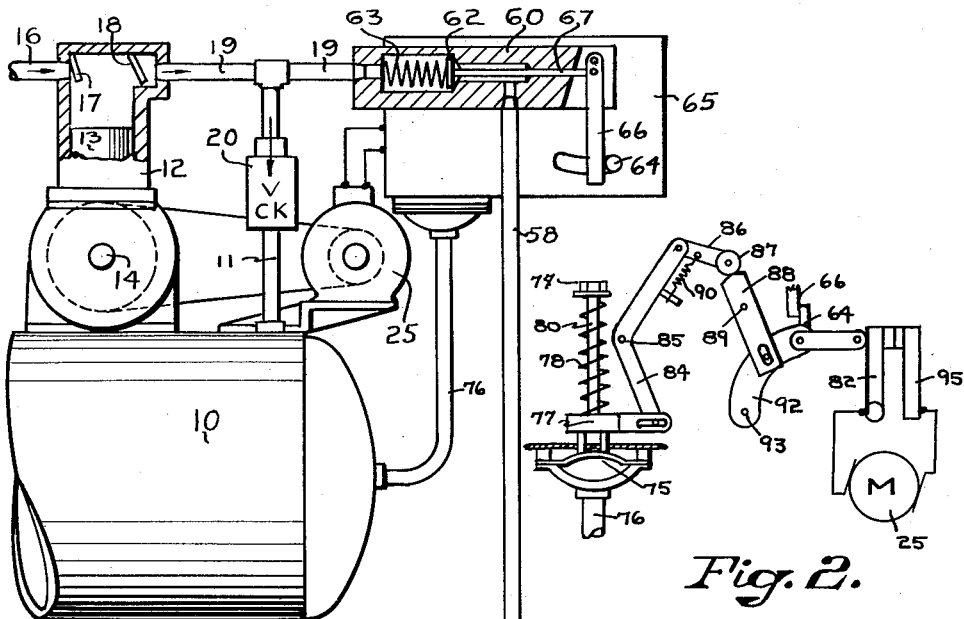
FIG. 2 is a diagrammatic view of the pressure controlled mechanism which causes a simultaneous stoppage of the compressor motor and unloading of the air pressure in the compressor piston chamber.

Various pressure controlled mechanisms may be used to open the unloading valve 62 when the motor 25 is stopped. As shown diagrammatically in FIG. 2, a standard construction may comprise a pressure operated diaphragm 75 subjected to the pressure of the compressed air derived from tank 10 through pipe 76. Excessive pressure above a predetermined maximum causes the diaphragm to lift the plate 77 against the adjustable pressure of a helical compression spring 78, preset by means of nut 79 threaded on the rod 80 attached to the plate 77. A set of linkages connects the plate 77 with the valve moving rod 64 and with the movable arm 82 of a suitable switch in the circuit of the motor 25. The linkage comprises the first class bent lever 84 pivoted at 85 and connected to the plate 77 through a pin on the lever riding in a slot in the plate. Upward movement of the plate when the pressure is maximum swings the top of the lever towards the left. An arm 86 pivoted on the top of the lever 84 carries a roller 87 arranged to snap over the high point of a rocking lever 88 pivoted at 89 and thrust the lever 88 in a clockwise direction. A strong coiled spring 90 connected between the lever 84 and the arm 86 causes the roller 87 to ride up the V-shaped top end of lever 88 and then to be snapped quickly down the left hand side of the V. The spring action causes the lower end of lever 88 to pull the lever 92 towards the left, the lever being pivoted at its lower end on a fixed pivot 93, as is permitted by a pin on the lever 92 riding in a vertical slot in the lever 88. The upper end of the lever 92 is suitably connected to move the pin 64 towards the left and cause the depending arm 66 to open the valve 62 as above explained. At the same time, the electrical contact arm 82 is rocked away from the fixed switch arm 95 and the motor circuit is broken and the compressor stopped.

When the pressure in the tank 10 reaches a minimum, a reverse action of the toggle linkage is caused by the spring 78 forcing the plate 77 downwards and moving the roller 87 to the right, which closes the electrical contact between the switch arms 82 and 95 and thus starts the motor. The valve 62 stays open until the pressure has reached a minimum, whereupon the spring 78 serves to move the roller 87 to the other side of the lever 88 and closes the switch, and at the same time the pin 64 moves out of the way of lever 66 and permits the valve 62 to be closed by its spring 63.

It will now be appreciated that in the simplicity of the construction lies an assurance of its operability under many conditions. There is only a single valve 40 which, when open, allows the air under pressure to scour out or drive ahead of it all of the water and sludge that may be in the pipe line 33 and space 31 above the valve. There is no compartment of fixed volume within which water may be stored, and the only limitation on the amount of liquid driven through the exit 37 lies in the extent of time during which the valve 40 is held open. That time element is governed by two major factors. One lies in the quantity and pressure of the air in the compressor head that is bled off by the pressure unloading device, and the other relates to the size of the exit orifice 70 at the bottom of the drain valve. The pipe line 58 and associated parts are so small in diameter that the major proportion of the pressure unloaded from the compressor head is available to operate the piston 48 of the valve, and since that compressed air drives the piston 48 rapidly upwards the valve 40 is opened fully for an initial discharge of water. The valve 40 will remain open until the air under pressure below the piston 48 can escape sufficiently to permit both the weight of the piston and the air pressure on the top of the valve 40 to seat the valve. The construction of FIGS. 1 and 3 permits regulating the rate at which the piston 48 descends and incidentally softens the shock of the closing valve.

The operation is extremely rapid, in that the piston 48 is moved upwardly at high speed to open the valve 40 and any excess of compressed air which has been derived from the compressor head will then escape freely to the atmosphere through the orifice 70. The time during which the piston 40 remains open will, therefore, be determined by the rate at which the piston 48 can fall back. If desired, the movement of either the valve stem 45 or the piston 48 may be aided by a suitably positioned spring, such as a helical compression spring located between the head 49 and the top of the chamber 50. This construction, as illustrated, has the valve stem head 49 separated from the piston 48 to allow the valve to seat freely and fully without reference to the piston position. The valve closing is effected by the compressed air on valve 40 and it is not effected by a direct reverse movement connection with the piston. When the charge of compressed air from the compressor head unloading device shoots the piston 48 upwardly, its sole purpose is to lift the valve 40. The closing of the valve depends on the rate at which the piston plunger 48 returns. Any looseness of the stem 45 in the valve casing can do no harm, and in fact, any slight amount of water which passes downwardly around the stem will act somewhat as a lubricant to insure easy operation of the valve. A looseness of fit of the piston 48 in its piston chamber is of no significance, since the action is almost instantaneous. In operation, there is a slight shock followed by a hiss of escaping air, and the valve closes again so quickly that there is no appreciable loss of air from the tank. If the piston has a comparatively loose fit and air escapes too rapidly around it, then it is merely necessary to rotate the adjustable orifice ring 72 to provide a smaller air opening 73.

It will be noted that the compressor head does not unload to the air through the valve 60 but unloads only through the drain valve and its exit orifices. Hence the air under pressure in the compressor piston chamber is directly available for operating the drain valve 40. This operation takes place each time that the compressor is stopped and while a charge of compressed air remains in the head of the compressor, and that residual air serves to operate the drain valve. If this system is installed on an automobile for the purpose of operating the brakes, then the drain valve may be opened each time that the brakes are released. The drain valve may be installed in various places in a compressed air system and wherever there is a reservoir subject to a tendency for water or sludge to accumulate. It will also be appreciated that if the drain valve is subjected to freezing, there is no chance for ice forming in the water exit passage 37 to block the operation of the piston 48, since these two parts of the valve are entirely separate. Any ice that might form in the discharge line would be blown out by the high pressure air from the tank so that the system is self-scouring. It should also be noted that the drain valve may discharge into any pipe line having a pressure less than that of the tank pressure. Hence, the threaded part 38 of the valve may carry air under pressure without affecting the valve operation.

It will now be appreciated that various modifications may be made in the structure within the scope of the invention and that the above disclosure of the principles of the invention and a preferred drain valve system and structure is not to be interpreted as imposing limitations on the appended claim.

What is claimed as the invention is:

A drain valve for an air compressor system comprising the combination of a motor driven compressor, a reservoir for the compressed air, a pressure contrlled device for stopping the compressor, an unloading device for discharging a limited quantity of compressed air from the stopped compressor and a drain valve for discharging accumulated water of condensation from the reservoir, said drain valve comprising a casing having a central wall separating and forming a drain valve compartment and a piston chamber at the opposite ends of the casing which are substantially non-communicating, a pipe connection for supplying air pressure to the outer end of the piston chamber, a piston slidably fitting in said chamber and mounted for movement inwardly towards said wall, said compartment having a central partition provided with a drain valve port therethrough, said casing having inlet and outlet ports on opposite sides of the partition, the inlet port being at the outer end of the casing remote from said wall and partition, and the outlet port being positioned near said wall, at the side thereof opposite the drain port, a pipe connection for delivering fluid to said inlet port, an annular valve seat surrounding the drain valve port which is located on the compartment inlet side of the partition, a drain valve movably seatable on said seat which is normally held thereon by air pressure from said delivery pipe connection, said central wall having an opening between said chamber and compartment which forms a slide bearing, a valve stem slidably fitting within and substantially closing the bearing opening, said drain valve being mounted for movement by the stem and said stem being arranged for movement by the piston to open the drain valve, said piston having a pressure face whose effective surface area is materially greater than that of the inlet side of the drain valve so that the piston will open the valve when both are exposed to the same air pressure, said piston chamber having an exit port near its inner end which permits a valve opening movement of the piston and having a discharge port which is remote from the pressure face of the piston when the valve is closed and is normally covered by the piston, said piston having an axial thickness relative to the location of the discharge port such that the piston moves to uncover the discharge port only after the drain valve has been opened to provide for a rapid discharge of the residual air under pressure in the piston chamber so that the air pressure on the drain valve may thereafter close it, said chamber having port means providing an outlet orifice of predetermined size communicating with the space at the outer side of the piston which limits the rate of out flow of air at the outer side of the piston so that the drain valve is returned toward its seat at a controlled rate by the air pressure on the drain valve after the discharge port has been closed.

References Cited in the file of this patent

UNITED STATES PATENTS

| | | |
|---|---|---|
| 1,708,172 | Halvorsen | Apr. 9, 1929 |
| 1,902,219 | Covey | Mar. 21, 1933 |
| 2,330,027 | Churchman | Sept. 21, 1943 |
| 2,505,663 | Churchman | Apr. 25, 1950 |
| 2,537,224 | Lansdale | Jan. 9, 1951 |
| 2,791,233 | Anderson | May 7, 1957 |
| 2,845,081 | George | July 29, 1958 |
| 2,881,796 | Garraway | Apr. 14, 1959 |

FOREIGN PATENTS

| | | |
|---|---|---|
| 469,603 | France | May 25, 1914 |